May 12, 1959  L. D. ANDERSON  2,886,378
PNEUMATIC TIRE BELT
Filed Dec. 2, 1955

Lincoln D. Anderson
INVENTOR.

BY *[signatures]*
Attorneys

2,886,378

PNEUMATIC TIRE BELT

Lincoln D. Anderson, Hanford, Calif.

Application December 2, 1955, Serial No. 550,673

1 Claim. (Cl. 305—10)

This invention generally relates to an endless belt and more specifically provides improved and novel construction in a power transmission device in the form of an inflatable-type of endless belt which may be employed for various purposes such as in the transmission of power from one pulley to another, as a traction device for a vehicle, as a conveyor, and other similar and related purposes to which the device may be especially adapted.

An object of the present invention is to provide a pneumatic belt which may be inflated by air or any other pressurized fluid or any combination of fluids such as air and sponge rubber whereby the device may be adapted for various purposes.

Another object of the present invention is to provide a pneumatic tire belt having various configurations especially adapted for various types of wheels or rims.

Another important object of the present invention is to provide a pneumatic tire belt which may have serrations or driving grooves and lugs for providing a positive displacement of the belt.

Other objects of the present invention will reside in its simplicity of construction, adaptation for many purposes, efficiency of operation and its relatively inexpensive manufacturing cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
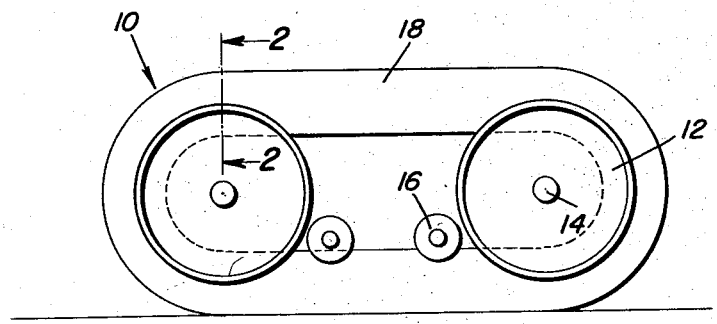
Figure 1 is a side elevational view, on a reduced scale, of the pneumatic tire belt of the present invention employed as a traction device for a vehicle.

Referring now specifically to Figure 1 of the official drawings, it will be seen that the numeral 10 generally designates the pneumatic tire belt of the present invention which is mounted in encircling relation to a pair of longitudinally spaced and aligned wheels 12 mounted on suitable axles 14 that are supported on a vehicle (not shown). A pair of idler wheels 16 are employed for providing additional support to the lower run of the pneumatic tire belt 10 substantially in the nature of an endless tread type of vehicle wherein one or both of the wheels 12 is employed as a driving wheel for giving a longitudinal or linear movement to the periphery of the tire belt 10 whereby the vehicle may be caused to move over a supporting surface.

Figure 2:
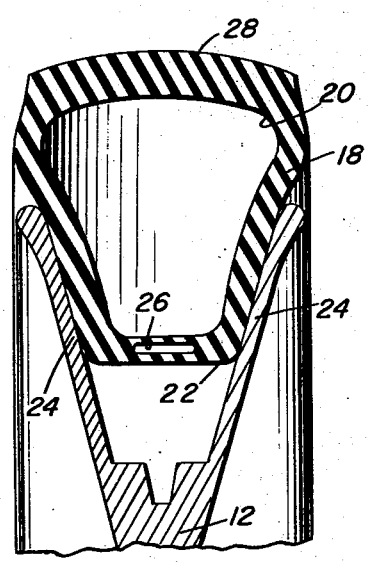
Figure 2 is a detailed sectional view, on an enlarged scale, taken substantially upon a plane passing along section line 2—2 of Figure 1 illustrating the details of construction of the tire belt and the rim of the wheel which it encircles.

As specifically illustrated in Figure 2, the pneumatic tire belt includes a continuous tubular member 18 having a hollow central portion 20 and a formed inner edge 22 received between outwardly converging flanges 24 of the wheel 12. The inner portion of the belt 18 is provided with an annular hollow area 26 which may be compressed to permit the belt 18 to be employed with wheels 12 having different characteristics of taper of the flanges 24. This area also permits compression and better gripping of the surface contact between the flanges 24 and the tire belt 18. The outer periphery of the belt 18 may be curved as indicated by the numeral 28 and may be provided with any suitable tread when the device is used as a tire.

Figure 3:
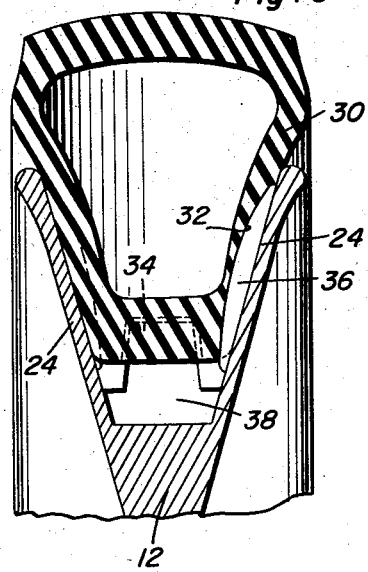
Figure 3 is a sectional view similar to Figure 2 illustrating a modified form of wheel and tire belt including interengaging the lugs and grooves; and, Figure 4 is a detailed sectional view similar to Figure 2 illustrating another form of wheel and tire belt.

Figure 3 illustrates a modified form of the invention wherein the tire belt 30 is substantially the same except that the side surfaces and the bottom or inner surface is provided with spaced grooves 32 and 34 for receiving projections 36 and 38 in the form of lugs whereby the tire belt 30 will be effectively gripped and positively driven.

Figure 4:
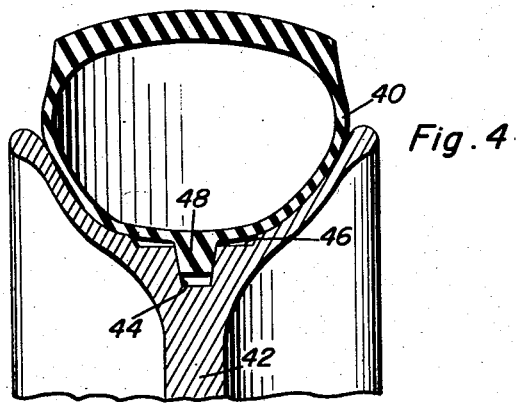

Figure 4 illustrates another form of the invention wherein the tire belt 40 is generally circular in configuration for use in conjunction with a drop center type of wheel 42 having a V-shaped recess 44 and an undercut portion 46 for receiving an inwardly extending V-shaped rib 48 on the belt 40 thereby permitting effective gripping between the belt 40 and the wheel 42.

It will be understood that the device may be employed for various other uses other than the specific illustrated use as a tire. For instance, the device may be used as an endless type of power transmission belt, as a conveyor and for many other purposes and the particular configuration of the tubular member may be altered to specifically adapt the device to its particular uses. Pressurized air, fluid or any combination of air and sponge material may be employed for inflating the device and by varying the characteristics of shape, size and inflation pressure, the device may be adapted for many uses.

The inflatable belt may be shaped with a cylindrical cross-section with or without the thickened tread on the outer surface and the slippage preventing grooves on the surface.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A power transmission arrangement comprising a pair of spaced and aligned wheels, each of said wheels having diverging peripheral flanges, an endless flexible belt encircling said wheels with a portion of the belt received between the flanges, said belt being hollow and inflatable throughout the entire length, at least a portion of the hollow portion of the belt being received between the flanges whereby inflation of the belt causes expansion thereof into frictional contact with the flanges thereby providing driving engagement between the belt and wheels, said belt being provided with a plurality of transverse grooves on the surfaces disposed for engagement with the flanges of the wheels and sockets in the inner surface thereof, each of the flanges of each of the wheels having a plurality of radially extending and circumferentially spaced lugs for interlocking engagement in the grooves and radially projecting lugs received in the sockets thereby providing a positive driving connection between the belt and the wheels.

References Cited in the file of this patent

UNITED STATES PATENTS

| | | |
|---|---|---|
| 1,150,223 | Overman | Aug. 17, 1915 |
| 1,773,534 | Kegresse | Aug. 19, 1930 |
| 2,376,802 | Morse | May 22, 1945 |
| 2,566,768 | Jones | Sept. 4, 1951 |
| 2,661,250 | Bonmartini | Dec. 1, 1953 |
| 2,661,251 | Bonmartini | Dec. 1, 1953 |
| 2,746,811 | Benson | May 22, 1956 |
| 2,776,746 | Envoldsen | Jan. 8, 1957 |

FOREIGN PATENTS

| | | |
|---|---|---|
| 292,623 | Italy | Jan. 26, 1932 |
| 283,628 | Switzerland | Oct. 16, 1952 |